United States Patent

Toyozumi et al.

[11] Patent Number: 5,537,013
[45] Date of Patent: Jul. 16, 1996

[54] CONTROL APPARATUS FOR POWER WINDOW

[75] Inventors: Morihiko Toyozumi; Naohiro Nakatsuji, both of Mie-ken, Japan

[73] Assignee: Sumitomo Wiring Systems, Ltd., Mie-ken, Japan

[21] Appl. No.: 403,578

[22] Filed: Mar. 14, 1995

Related U.S. Application Data

[63] Continuation of Ser. No. 102,989, Jul. 28, 1993, abandoned.

[30] Foreign Application Priority Data

Sep. 2, 1992 [JP] Japan .................... 4-260669

[51] Int. Cl.⁶ ..................................................... H02P 7/00
[52] U.S. Cl. ................... 318/283; 318/466; 49/28
[58] Field of Search ..................... 318/280–286, 318/265, 266, 466–470; 49/26, 28; 361/23, 31; 160/291, 272, 293.1; 307/10.1, 10.2, 38

[56] References Cited

U.S. PATENT DOCUMENTS

| | | | |
|---|---|---|---|
| 3,733,532 | 5/1973 | Hill | 318/286 |
| 4,562,387 | 12/1985 | Lehnhoff | 318/258 |
| 4,578,591 | 3/1986 | Floyd et al. | 307/10.1 |
| 4,628,234 | 12/1986 | Mizuta et al. | 318/286 X |
| 4,641,067 | 2/1987 | Iizawa et al. | 318/286 X |
| 4,686,598 | 8/1987 | Herr | 361/31 |
| 4,883,974 | 11/1989 | Tinder | 307/38 X |
| 4,907,153 | 3/1990 | Brodsky | 318/466 X |
| 5,081,586 | 1/1992 | Barthel et al. | 318/466 X |

FOREIGN PATENT DOCUMENTS

| | | |
|---|---|---|
| 0131489 | 1/1985 | European Pat. Off. . |
| 0473068 | 3/1992 | European Pat. Off. . |
| 2053513 | 2/1981 | United Kingdom . |
| 2237658 | 5/1991 | United Kingdom . |

*Primary Examiner*—Jonathan Wysocki
*Attorney, Agent, or Firm*—Sughrue, Mion, Zinn, Macpeak & Seas

[57] ABSTRACT

This invention prevents a power window from trapping a hand or the like during manual opening and closing of the window as well as during automatic opening and closing of the window. A current-flowing unit 56 flows a current in a closing direction in a power window motor 58 by turning on a sub-switch 57 for a passenger's seat window. While a catching detector 61 generates a detecting signal when an obstacle is present, a breaker 63 breaks a current flowing in a closing direction in the motor 58 through the unit 56 by turning off a master switch 39 for the passenger's seat. A reversing unit 65 rotates the motor 58 in a reverse direction by flowing a current in an opening direction in the motor 58. Even if an obstacle is present during an operation of closing the manual sub-switch 57, it is possible to release window, thereby freeing the obstacle.

2 Claims, 9 Drawing Sheets

CONTROL APPARATUS FOR POWER WINDOW

This is a continuation of application Ser. No. 08/102,989 filed Jul. 28, 1993 abandoned.

BACKGROUND OF THE INVENTION

1. Field of the Invention

This invention relates to a control apparatus for a power window in an automobile, which has a safety function of detecting an accident in which a hand or the like is caught by or trapped in the power window during closing it.

2. Statement of the Prior Art

In a power window system in an automobile having four doors, in a driver's seat door there is generally provided a driver's seat window switch and a master switch for opening and closing windows in the passenger and rear seat doors. Sub-switches which open and close each window in the doors are provided in respective doors. The driver's seat window switch has two functions; i.e., an automatic function for automatically opening and closing the window in the driver's seat door into completely open and closed positions at a touch, and a manual function for opening and closing said window to an extent determined by depression of the switch. The master switch and sub-switches are generally provided to have only the latter manual function.

For convenience of explanation, a prior control apparatus in a power window system will be explained by referring to the drawing.

Figure 7:
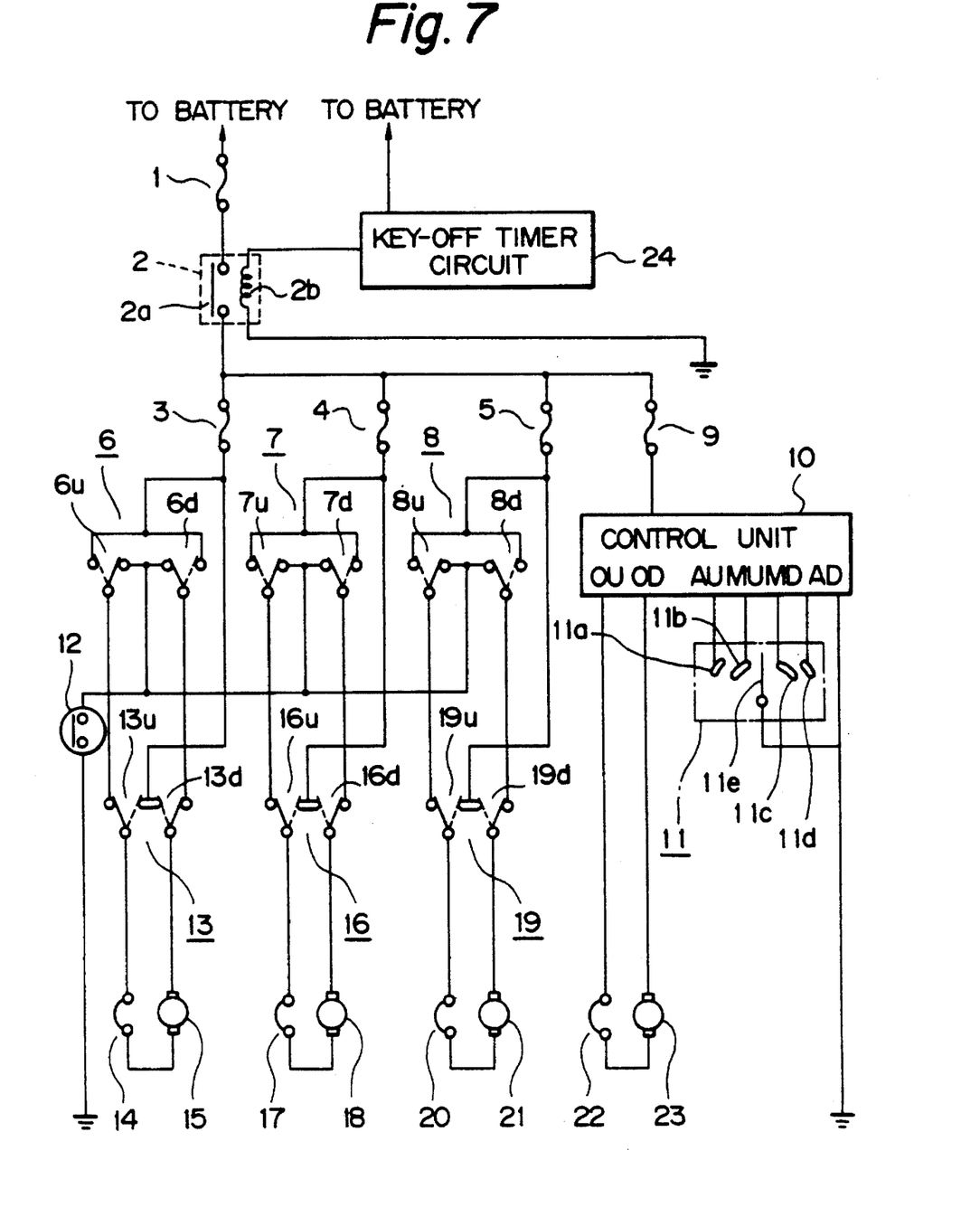
FIG. 7 is a connecting diagram of a prior control apparatus for a power window.

FIG. 7 shows an example of a connecting diagram of the prior control apparatus in the power window system. A power window relay 2 provided in a fuse box is connected at one end of an a-contact 2a via a main fuse 1 to a battery. The other end of the a-contact 2a is connected via fuses 3, 4, and 5 in the fuse box to normal open terminals of up side switch parts 6u, 7u, and 8u and down side switch parts 6d, 7d, 8d in a master switch 6 for a rear left seat, a master switch 7 for a rear right seat and a master switch 8 for a passenger's seat.

Also, the other end of the a-contact 2a in the power window relay 2 is connected via a fuse 9 in the fuse box to a power source terminal of a control unit 10 for the driver's seat power window. An automatic up input terminal AU, a manual up input terminal MU, a manual down input terminal MD, and an automatic down input terminal AD in the control unit 10 are connected to an automatic up terminal 11a, a manual up terminal 11b, a manual down terminal 11c, and an automatic down terminal 11d in the driver's seat power window switch 11, respectively. A changing-over piece 11e in the driver's seat power window switch 11 is connected to the earth together with an earth terminal in the control unit 10.

Further, a main switch 12 provided on the driver's seat door is connected between normal close terminals of the switch parts 6u, 6d, 7u, 7d, 8u, and 8d of the master switches 6 to 8 and the earth. By turning the main switch 12 on, each of the master switches 6 to 8 and each of sub-switches described hereinafter are enabled to operate. By turning the main switch 12 off, each of the master switches 6 to 8 and the sub-switches are prevented from operating.

A common terminal of both switch parts 6u and 6d in the master switch 6 for the rear left seat is connected to normal close terminals of an up side switch part 13u and a down side switch part 13d in a sub-switch 13 for the rear left seat. Normal open terminals of the switch parts 13u and 13d are connected via the fuse 3 to the other end of the a-contact 2a in the relay 2. A serial circuit including a circuit breaker 14 and a power window motor 15 for the rear left seat is connected between common terminals of the switch parts 13u and 13d.

A common terminal of both switch parts 7u and 7d in the master switch 7 for the rear right seat is connected to normal close terminals of an up side switch part 16u and a down side switch part 16d in a sub-switch for the rear right seat. Normal open terminals of the switch parts 16u and 16d are connected via the fuse 4 to the other end of the a-contact 2a in the relay 2. A serial circuit including a circuit breaker 17 and a power window motor 18 for the rear right seat is connected between common terminals of the switch parts 16u and 16d.

In addition, a common terminal of the switch parts 8u and 8d in the master switch 8 for the passenger's seat 8 is connected to normal close terminals of an up side switch part 19u and a down side switch part 19d in a sub-switch 19 for the passenger's seat. Normal open terminals of the both switch parts 19u and 19d are connected via a fuse 5 to the other end of the a-contact 2a in the relay 2. A serial circuit including a circuit breaker 20 and a power window motor 21 for the passenger's seat is connected between common terminals of the switch parts 19u and 19d.

A serial circuit including a circuit breaker 22 and a power window motor 23 for the driver's seat is connected between an up output terminal OU and a down output terminal OD in the control unit 10. A detector which detects complete open and closed positions of the window in the driver's seat in accordance with an amount of rotation of the motor 23 is provided between the earth and an input terminal for a detecting signal in the control unit 10. When the detector applies a detecting signal indicating the complete open or closed position to the control unit 10, an automatic opening or closing operation ceases.

A key-off timer circuit 24 is also provided in the fuse box. A power source terminal in the timer circuit 24 is connected via a fuse to the battery. A relay coil 2b in the power window relay 2 is connected between the earth and an output terminal of the timer circuit 24. The timer circuit 24 is energized by turning on an ignition key switch and maintains energization for a given period of time set by the timer after turning off the ignition key switch. During that period, the relay coil 2b maintains energization so that each of the switches 6 to 8, 11, 13, 16, and 19 are enabled to operate.

When the power window switch 11 for the driver's seat is changed over to the automatic up terminal 11a or the automatic down terminal 11d, a current from the control unit 10 flows in a closing direction or an opening direction in the power window motor 23 for the driver's seat, thereby automatically closing or opening the window in the driver's seat door into a completely closed or open position.

On the other hand, when the power window switch 11 for the driver's seat is changed over to the manual up terminal 11b or the manual down terminal 11c, a current from the control unit 10 flows in the closing direction or the opening direction in the driver's seat motor 23, thereby manually closing or opening the window in the driver's seat only during operation of the switch 11.

When each of the master switches 6 to 8 is changed over to the up side or down side, the up side switch parts 6u, 7u, and 8u or the down side switch parts 6d, 7d, and 8d in the switches 6 to 8 are changed over to the normal open terminals and a current flows in the closing or opening direction in the motors 15, 18, and 21 only during operation of the switches 6 to 8, thereby manually closing or opening the window in the rear seat doors, or the passenger's seat door.

Further, when each of the sub-switches 13, 16, and 19 is changed over to the up or down side, the up side switch parts 13u, 16u, and 19u or the down side switch parts 13d, 16d, and 19d in the switches 13, 16, and 19 are changed over to the normal open terminals and a current flows in the closing or opening direction in the motors 15, 18, and 21 only during operation of the switches 13, 16, and 19, thereby manually closing or opening the window in the rear right or left seat door, or the passenger seat door.

In the above construction, for example, if the master switch 6 for the rear left seat and the sub-switch 13 for the rear left seat are reversely operated simultaneously, that is, if the master switch 6 for the rear left seat is changed over to the down side while the up side switch part 13a is changed over to the normal open terminal by changing over the sub-switch for the rear left seat to the up side, the down switch part 6d of the master switch 6 is changed over to the normal open terminal when a current flows in the closing direction in the power window motor 15 for the passenger's seat via the normal open terminal of the up side switch part 13a. Thus, the power window motor 15 for the passenger's seat is stopped while it is rotating in the closing direction. The same result is obtained in the case that the other master switches and sub-switches are reversely operated at the same time.

On the other hand, when a hand, or the like is accidentally caught by the window by changing over the sub-switches 13, 16, and 19 in the other seat than the driver's seat, the hand or the like is released by changing over the sub-switch to the down side. However, a small child obviously cannot carry out such a switching operation.

It will be possible to release a hand or the like by changing over one of the master switches 6 to 8 in the associated seat to the down side in the driver's seat. However, if the master switch and the sub-switch are reversely operated at the same time, as mentioned above, the power window motor cannot rotate in the opening direction but stops. Consequently, it is impossible to release a hand or the like caught by the window. In the case of stopping the operation of the master switch, the power window motor may rotate again in the closing direction to continue to trap a hand or the like. Accordingly, there is a danger that the operation of the master switch cannot be stopped.

In order to prevent such an accident, for example, Japanese Patent Public Disclosure No. 61-78984 (1986) discloses a safety device for a power window. This device can prevent a hand or the like from becoming trapped during automatic opening and closing but this device is not directed to a device which stops the power window motor during manual opening and closing when the master switch and the sub-switch are reversely operated at the same time at the same time.

SUMMARY OF THE INVENTION

An object of the present invention is to provide a control apparatus for a power window which can prevent a hand or the like from becoming trapped in a power window in an automobile during manual opening and closing thereof as well as during automatically opening and closing.

In order to achieve the above object, a control apparatus for a power window in accordance with the present invention is directed to a control apparatus in which an on-off operation of an automatic power window switch provided in a driver's seat door automatically opens and closes a window to completely open and closed positions and a safety function for opening the window into a completely open position is provided when an overload occurs during an operation of closing the window to a completely closed position. The device comprises: a manual power window switch for opening and closing a window provided in a seat door except for that of the driver's seat;

means for flowing currents in opening and closing directions in a power window motor during an on-off operation of said manual power window switch; means for detecting an obstacle caught in the window during flowing the current in the closing direction in said power window motor to generate a detecting signal; means for breaking the current flowing in the closing direction in the power window motor in response to said detecting signal from said detecting means; and means for reversely rotating said power window motor by flowing the current in the opening direction in said motor in response to said detecting signal.

In the present invention, the current-flowing means flows a current in the closing direction in the power window motor for the associated window by closing the manual power window switches provided for seats other than the driver's seat. When a catching accident occurs during closing a window, the detecting means generates the detecting signal. The breaking means breaks the current flowing in the closing direction in the power window motor. The reversing means reversely rotates the power window motor by flowing the current in the opening direction in the motor, so that the window is opened to release an obstacle.

DETAILED DESCRIPTION OF THE PREFERRED EMBODIMENTS (A First Embodiment)

Figure 1:
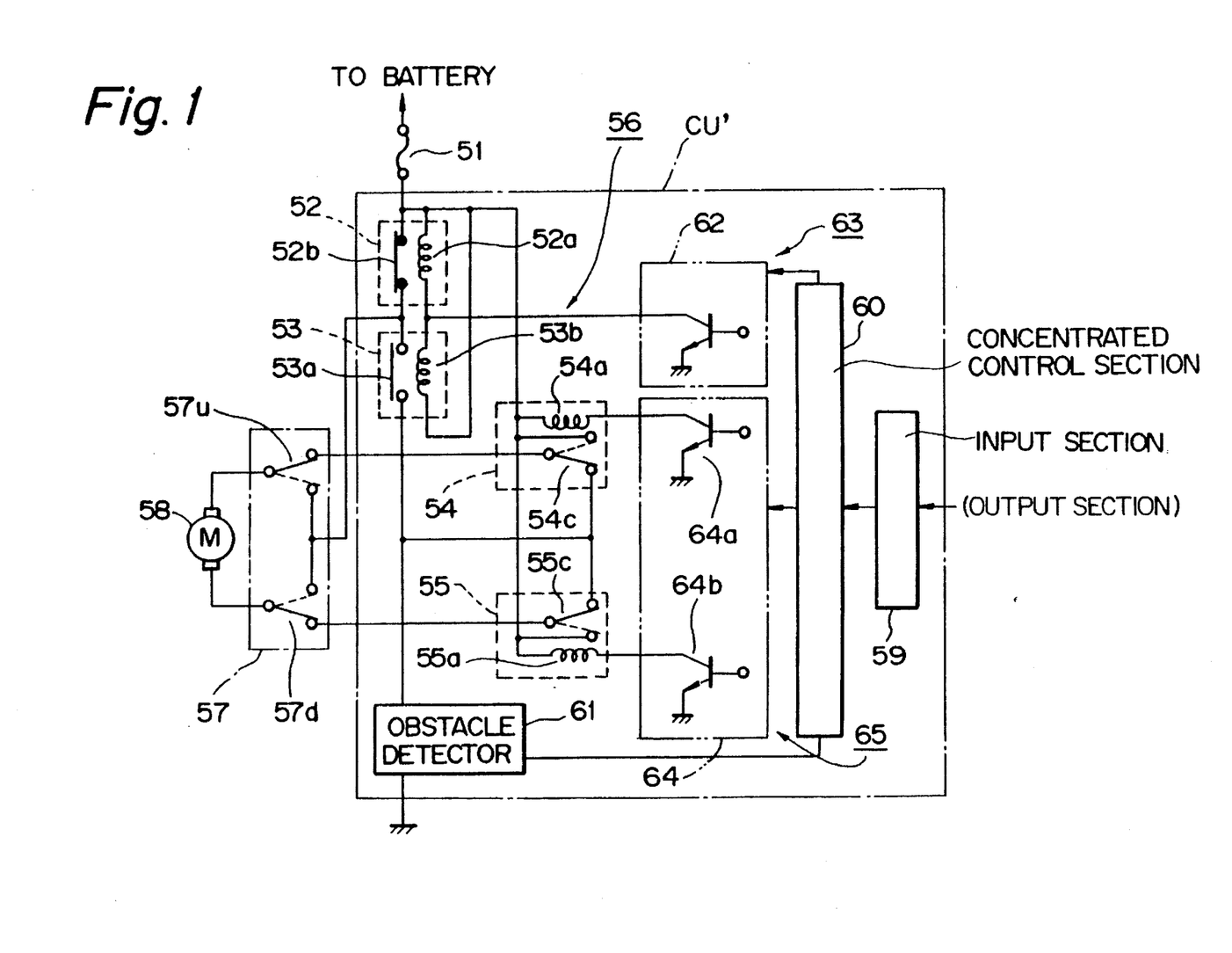
FIG. 1 is a connecting diagram of a part of a first embodiment of a control apparatus for a power window in accordance with the present invention.
Figure 2:
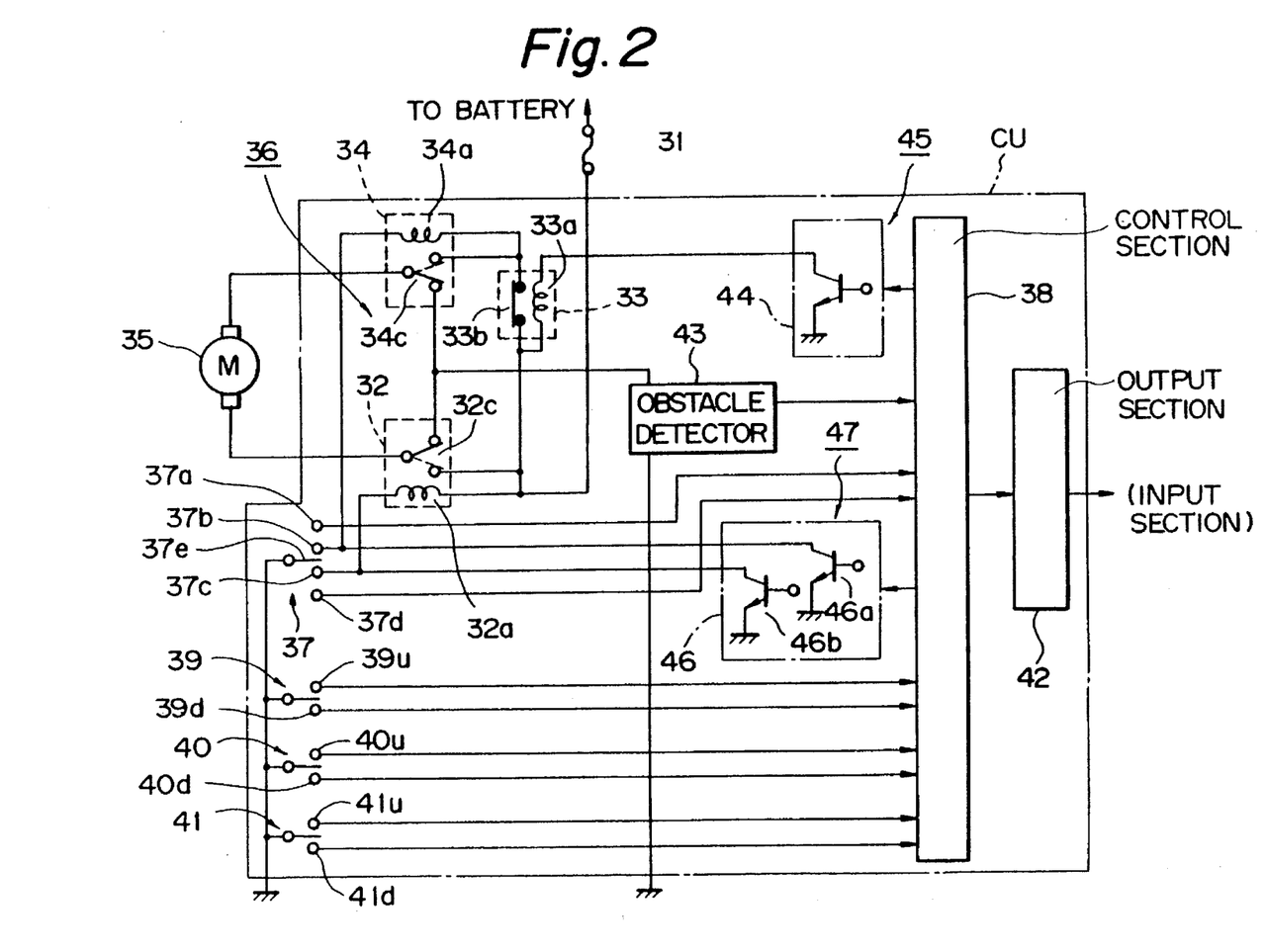
FIG. 2 is a connecting diagram of another part of the first embodiment.

Referring now to FIGS. 1 to 5 and 8, a first embodiment of a control apparatus for a power window in accordance with the present invention will be described below. First, by referring to FIG. 2, a construction of a control unit CU provided in a door or the like in a driver's seat will be explained. As shown in FIG. 2, one end of a relay coil 32a in a first relay 32 and a normal open terminal of a c-contact 32c in the first relay 32 are connected via a fuse 31 to a battery. Similarly, one end of a relay coil 33a in a second relay 33 and one end of a b-contact 33b in the second relay 33 are connected via the fuse 31 to the battery. One end of a relay coil 34a and a normal open terminal of a c-contact 34c in a third relay 34 are connected to the other end of the b-contact 33b in the second relay 33. A power window motor 35 for a window in a driver's seat door is connected between common terminals of the c-contacts 32c and 34c in the first and third relays 32 and 34. The first relay 32 through the third relay 34 forms a current-flowing section 36.

A power window switch 37 for the driver's seat (hereinafter referred to as "driver switch") includes an automatic up terminal 37a, a manual up terminal 37b, a manual down terminal 37c, an automatic down terminal 37d, and a changing-over piece 37e connected to the earth. The driver switch 37 has functions such as a power window switch for automatically opening and closing the window and a power window switch for manually opening and closing the window. When the driver switch 37 is changed over to the automatic up terminal 37a or the automatic down terminal 37d, the power window motor 35 is driven until the window is moved into a completely open position or a completely closed position, as described below. When the driver switch 37 is changed over to the manual up terminal 37b or the manual down terminal 37c, the power window motor 35 is driven only effective during operation of the switch, as described in detail below.

Then, the automatic up and down terminals 37a and 37d are connected to the automatic up and down input terminals in a control section 38, respectively.

A master switch 39 for a passenger's seat, a master switch 40 for a rear left seat, and a master switch 41 for a rear right seat as manual power window switches are provided in the driver's seat door. Common terminals of the switches 39 to 41 are connected to the earth. Up side terminals 39u, 40u, and 41u and down side terminals 39d, 40d, 41d are connected to up input terminals and down input terminals of the switches 39 to 41 in the control section 38, respectively. An operating signal from the control section 38 is applied via an output unit 42 to an input section in a control unit in each seat other than the driver's seat during operation of each of the switches 39 to 41, as described below.

A catching detector 43 is provided between the earth and normal close terminals of the c-contact 32c and 34c in the first and third relay 32 and 34. The catching detector 43 detects a surplus current due to the existence of an obstacle while the power window motor 35 is closing the window by flowing a current in the closing direction in the motor. The catching detector 43 applies a detecting signal to the control section 38.

A breaker 44 comprises an NPN transistor in which a collector is connected to the other end of the relay coil 33a in the second relay 33 and an emitter is connected to the earth. A first output circuit in the control section 38 applies a breaking signal to the breaker 44 in response to a detecting signal from the catching detector 43 to the control section 38. The current flowing in the closing direction in the power window motor 35 is broken from the current-flowing section when the transistor of the breaker 44 turns on and the b-contact 33b in the second relay 33 by energizing the second relay 33. The first output circuit including the breaker 44 and the control section 38 constructs a breaking section 45.

A motor driver 46 comprises two NPN transistors 46a and 46b in which collectors are connected to the manual up terminal 37b and the manual down terminal 37c in the driver switch 37, respectively and emitters are connected to the earth. A second output circuit of the control section 38 applies an opening control signal to the motor driver 46 to turn the transistors 46a and 46b off and on in response to the detecting signal from the catching detector to the control section 38. The power window motor 35 rotates reversely by flowing a current in the opening direction in the motor 35. Thus, the second output circuit including the motor driver 46 and the control section 38 constructs a motor reversing section 47.

Figure 3:
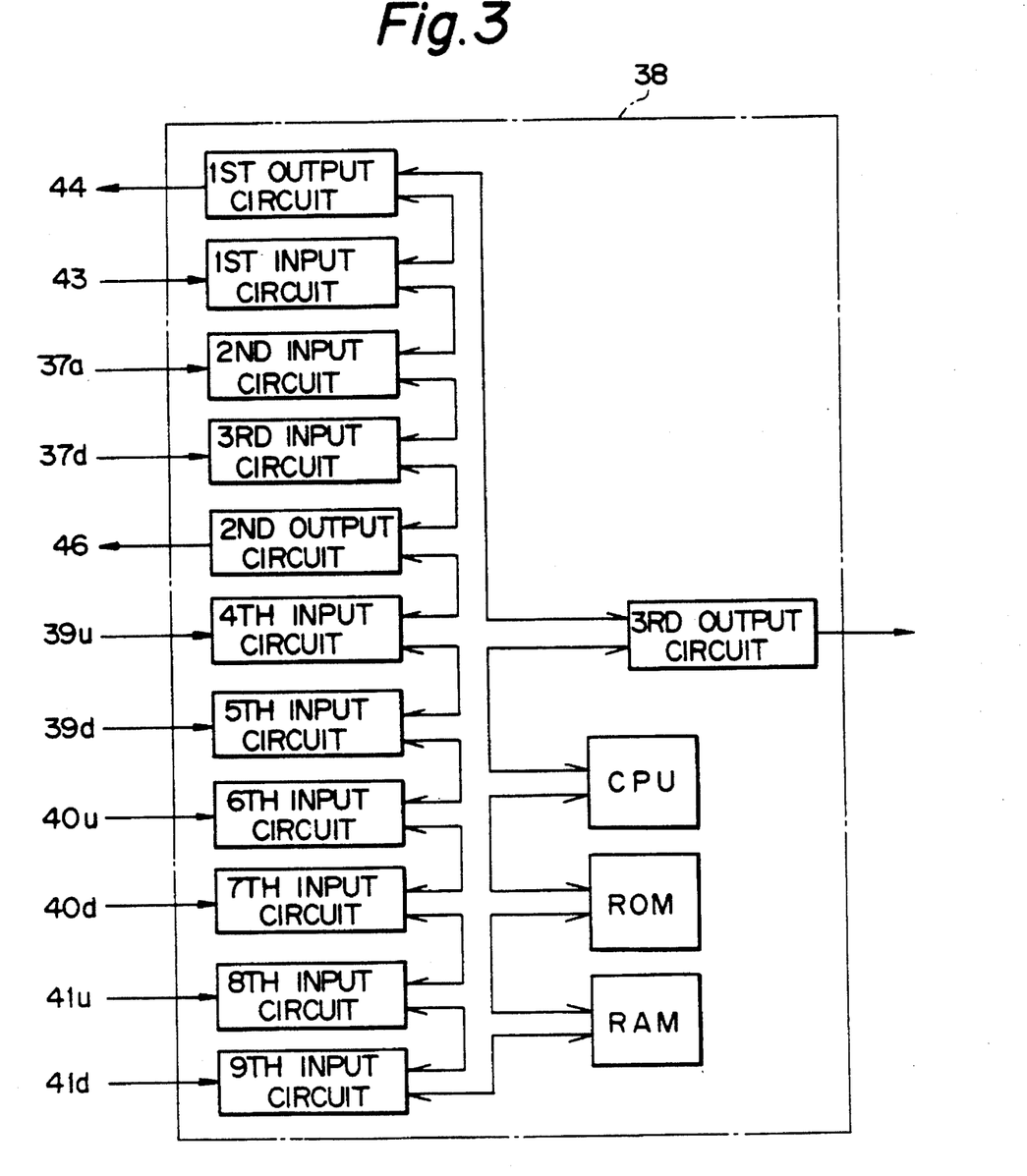
FIG. 3 is a block diagram of a part of FIG. 2.

FIG. 3 shows a block diagram of the control section 38. The control section 38 comprises 1st to 3rd output circuits, 1st to 9th input circuits, a CPU, an ROM memorizing a processing program and an RAM for a data memory. The input circuits are connected to terminals of the switches 37 and 39 to 41, respectively. The third output circuit applies the respective signals in accordance with operations of the master switches 39 to 41 to the output section 42.

In the case that the driver switch 37 is changed over to the automatic up terminal 37a, the automatic up terminal 37a and the manual up terminal 37b are simultaneously connected via the changing-over piece 37e to the earth until the associated window is moved into a completely open position. In the case that the driver switch 37 is changed over to the automatic down terminal 37d, the automatic down terminal 37d and the manual down terminal 37c are simultaneously connected via the changing-over piece 37e to the earth until the associated window is moved into a completely closed position.

When the driver switch 37 is changed over to the manual up terminal 37b, the manual up terminal 37b is connected to the earth during operating the driver switch 37. Then, the relay coil 34a of the third relay 34 is energized via the b-contact 33b of the second relay 33 and the c-contact 34c of the third relay 34 is changed over to the normal open terminal. A current from the battery flows to the earth via the b-contact 33b of the second relay 33, the c-contact 34c of the third relay 34, the power window motor 35, the c-contact 32c of the first relay 32, and the catching detector 43. The current flows in the closing direction in the power window motor 35 only during operation of the driver switch 37 and the associated window is thereby "manually" closed.

On the other hand, similarly, when the driver switch 37 is changed over to the manual down terminal 37c, the manual down terminal 37c is connected to the earth during the operation of driver switch 37. Then the relay coil 32a of the first relay 32 is energized via the b-contact 33b of the second relay 33 and the c-contact 32c of the first relay 32 is changed over to the normal open terminal. A current from the battery flows to the earth via the b-contact 33b of the second relay 33, the c-contact 32c of the first relay 32, the power window motor 35, the c-contact 34c of the third relay 32, and the catching detector 43. The current flows in the opening direction in the power window motor 35 only during operating the driver switch 37 and the associated window is thereby "manually" opened.

In the case that the drive switch 37 is changed over to the automatic up terminal 37a, as mentioned above, the automatic up terminal 37a and the manual up terminal 37b are simultaneously connected to the earth. Meanwhile, the c-contact 34c of the third relay 34 is changed over to the normal open terminal by the same manner in the manual closing operation. The current flows in the closing direction in the power window motor 35 until the associated window is automatically moved into the completely closed position.

In addition, when the driver switch 37 is also changed over to the automatic down terminal 37d, as mentioned above, the automatic down terminal 37d and the manual down terminal 37c are simultaneously connected to the earth. Meanwhile, the c-contact 34c of the first relay 32 is changed over to the normal open terminal by the same manner in the manual opening operation. The current flows in the opening direction in the power window motor 35 until the associated window is automatically moved into the completely open position.

Referring to FIG. 1, construction of the passenger's seat sub-switch provided in the passenger's seat door and a control unit CU' will be described below. In the case of an automobile with four doors, since sub-switches in the rear seat doors and the control unit have the same construction as that shown in FIG. 1, only the construction of FIG. 1 will be explained.

As shown in FIG. 1, one end of a relay coil 52a and the other end of a b-contact in a fourth relay 52 are connected via a fuse 51 to the battery. One end of an a-contact 53a in a fifth relay 53 is connected to the other end of a b-contact 52b. Opposite ends of a relay coil 53b of the fifth relay 53 are connected to opposite ends of the relay coil 52a, respectively. Each end of relay coils 54a and 55a in a sixth relay 54 and a seventh relay 55 is connected via the fuse 51 to the battery. Normal close terminals of c-contacts 54c and 55c in the sixth and seventh relays 54 and 55 are connected to the other end of the a-contact 53a in the fifth relay 53 while normal open terminals of them are connected to the fuse 51. The fourth through seventh relays 52 through 55 form a current-flowing section 56.

Normal open terminals of an up side switch part 57u and a down side switch part 57d in a passenger's seat sub-switch 55 as a power window switch for manually opening and closing a window are connected to the other end of the b-contact 52b of the fourth relay 52. Normal close contacts of the switch parts 57u and 57d are connected to normal close terminals of the c-contacts 54c and 55c of the sixth and seventh relays 54 and 55, respectively. A power window motor 58 for a passenger's seat door window is connected between common terminals of the both switch parts 57u and 57d.

An operating signal in accordance with operations of the master switches 39 to 41 is applied from the output section 42 via an input section 59 to a first input circuit of a concentrated control section 60. A catching detector 61 is provided between the other end of the a-contact 53a in the fifth relay 53 and the earth by the same manner as in the driver's seat. The obstacle detector 61 detects a surplus current caused by catching a hand or the like by the window when the power window motor 58 is closing the window by flowing a current in the closing direction in the motor 58 during operation of the up side switch part 57u in the sub-switch 57. A detecting signal from the catching detector 61 is applied to a second input circuit of the concentrated control section 60.

A breaker 62 comprises an NPN transistor in which a collector is connected to the other end of the relay coil 52a in the fourth relay 52 and an emitter is connected to the earth. A first output circuit in the concentrated control section 60 applies a breaking signal to the breaker 62 in response to a detecting signal from the catching detector 61 to the concentrated control section 60 during closing the up side switch part 57u in the sub-switch 57. Then a transistor in the breaker 62 turns on and the fourth and fifth relays 52 and 53 are energized. The b-contact 52b in the fourth relay 52 turns off and the a-contact 53a in the fifth relay 53 on. Consequently, the current flowing in the closing direction in the power window motor 58 is broken. The first output circuit including the breaker 62 and the concentrated control section 60 constructs a breaking section 63.

A motor driver 64 comprises two NPN transistors 64a and 64b in which collectors are connected to the other end of the relay coils 54a and 55a in the sixth and seventh relays 54 and 55 and emitters are connected to the earth. When a detecting signal from the obstacle detector 61 is being applied to the concentrated control section 60, an opening signal is applied from the output section 42 to the concentrated control section 60 by changing over to the down side terminal 39d in the passenger's seat master switch 39. A second output circuit of the concentrated control section 60 applies an opening control signal to the motor driver 64 to turn the transistors 64a and 64b off and on. Thus, the second output circuit including the motor driver 64 and the concentrated control section 60 constructs a motor reversing section 65.

Figure 4:
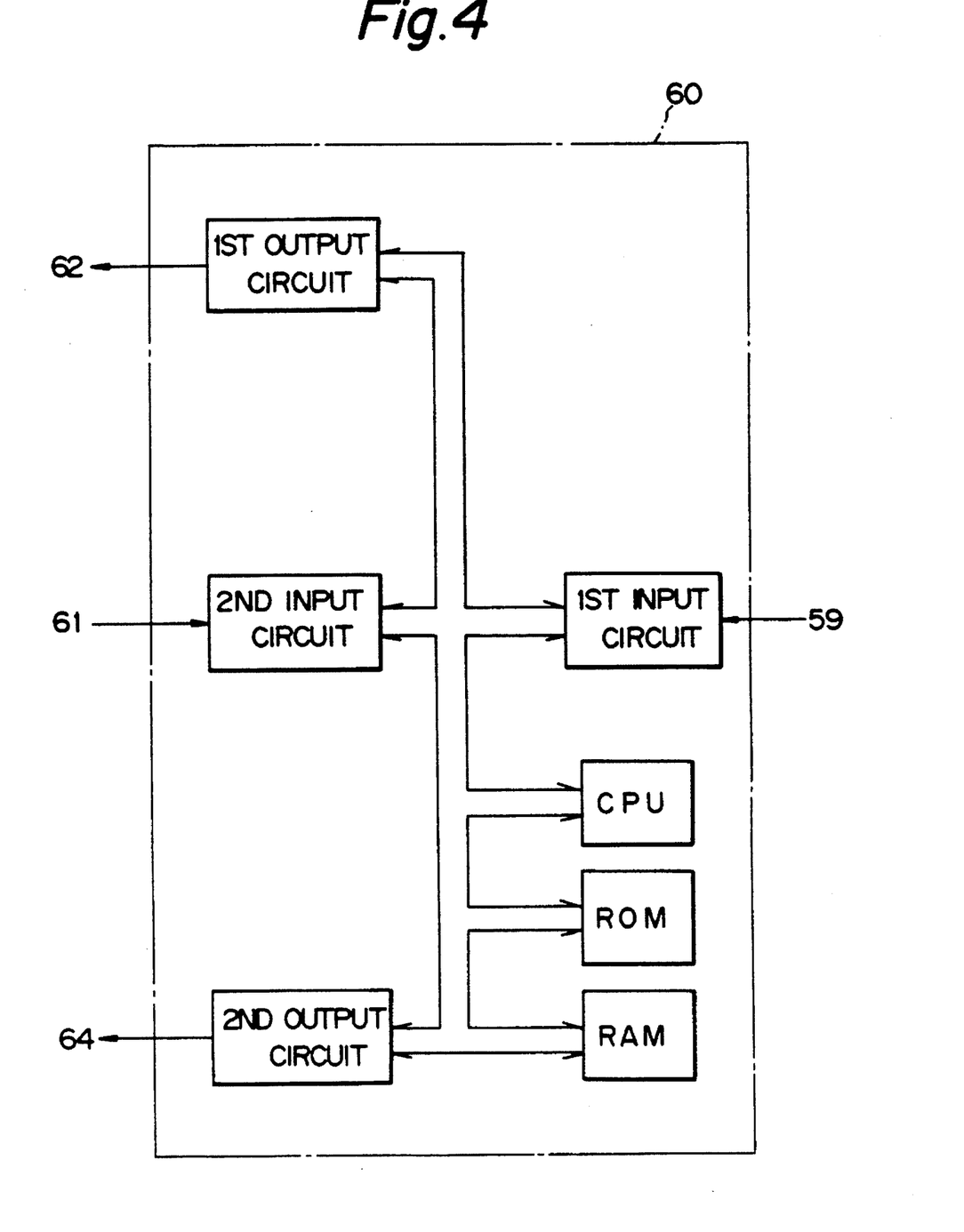
FIG. 4 is a block diagram of a part of FIG. 1.

FIG. 4 shows a block diagram of the concentrated control section 60. The section 60 comprises the above first and second output and input circuits, a CPU, an ROM memorizing a processing program, and an RAM for a data memory.

A closing or opening signal in accordance with an operation of changing over to the up side terminal 39u or the down side terminal 39d in the passenger's master switch 39 is applied via the input section 59 to the concentrated control section 60. Then, in the case of the closing signal, the closing control signal from the concentrated control section 60 is applied to the motor driver 64, so that the transistors 64a and 64b turn on and off. The relay coil 54a of the sixth relay 54 is energized to change over the c-contact 54c to the normal open terminal, the current from the battery flows to the earth via the c-contact 54c, the up side switch part 57u of the sub-switch 57, the power window motor 58, the down side switch part 57d, the c-contact 55c of the seventh relay 55, and the obstacle detector 61. The current flows in the closing direction in the power window motor 58 during operating the master switch 39 for the passenger's seat, so that the window in the passenger's seat door can be manually closed by the operation in the driver's seat.

On the other hand, in the case that an input signal to the concentrated control section 60 is an opening signal, the opening control signal from the concentrated control section 60 is applied to the motor driver, so that the transistors 64a and 64b turn on and off. The relay coil 55a of the seventh relay 55 is energized to change over the c-contact 55c to the normal open terminal. The current from the battery flows to the earth via the c-contact 55c, the down side switch part 57d of the sub-switch 57, the power window motor 58, the up side switch part 57u, the c-contact 54c of the sixth relay 54, and the obstacle detector 61. The current flows in the opening direction in the power window motor 58 during operating the master switch 39 for the passenger's seat, so that the window in the passenger's seat door can be manually opened by the operation in the driver's seat.

In the case that the up side switch part 57u of the sub-switch 57 is changed over, the current from the battery flows to the earth via the b-contact 52b of the fourth relay 52, the up side switch part 57u, the power window motor 58, the down side switch part 57d, the c-contact 55c of the seventh relay 55, and the obstacle detector 61. The current flows in the closing direction in the power window motor 58 only during operating the sub-switch 57, so that the associated window can be manually closed in the passenger's seat door.

In the case that the down side switch part 57d of the sub-switch 57 is changed over, the current from the battery flows to the earth via the b-contact 52b of the fourth relay 52, the down side switch part 57d, the power window motor 58, the up side switch part 57u, the c-contact 54c of the sixth relay 54, and the obstacle detector 61. The current flows in the opening direction in the power window motor 58 only during operating the sub-switch 57, so that the associated window can be manually opened in the passenger's seat.

When a hand or the like is caught by the associated window during operating the up side switch part 57u in the sub-switch 57, the catching detector 61 detects a surplus current flowing in the power window motor 58 due to catching. When the detecting signal is applied to the concentrated control section 60, the breaker 63 and the motor reversing section 65 are actuated. Then, the breaking control signal from the first output circuit of the concentrated control section 60 is applied to the breaker 62 and the opening control signal from the second output circuit is applied to the motor driver 64.

The transistor in the breaker 62 turns on and the relay coils 52a and 53b in the fourth and fifth relays 52 and 53 are energized. The b-contact 52b of the fourth relay 52 turns off and the a-contact 53a of the fifth relay 53 turns on. The transistors 64a and 64b in the motor driver 64 turn off and on, respectively. The c-contact 55c of the seventh relay 55 is changed over to the normal open terminal. The current from the battery flows to the earth via the c-contact 55c, the down side switch part 57d of the sub-switch 57, the power window motor 58, the up side switch part 57u, the a-contact 53a of the fifth relay 53, and the catching detector 61. The current flows in the opening direction in the power window motor 58 to open the associated window.

Since the constructions of the sub-switches provided in the rear right and left seat doors and of the control unit have the same construction as that shown in FIG. 1, the windows in the rear right and left seat doors are manually opened in the same manner as in the above operation to avoid trapping an obstacle.

Figure 5A:
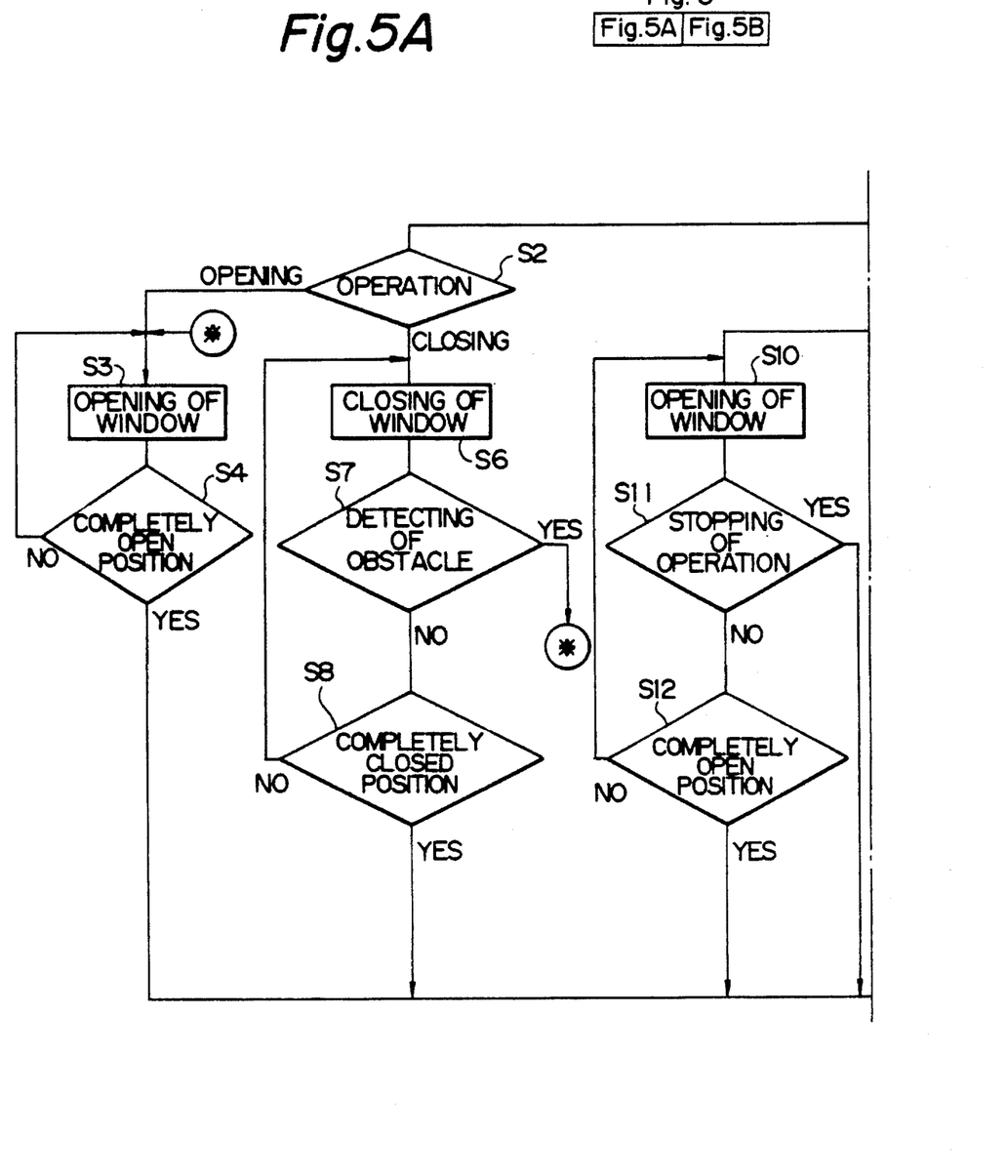
FIGS. 5(A)–5(B) is a flow chart illustrating an operation of the first embodiment.
Figure 5B:
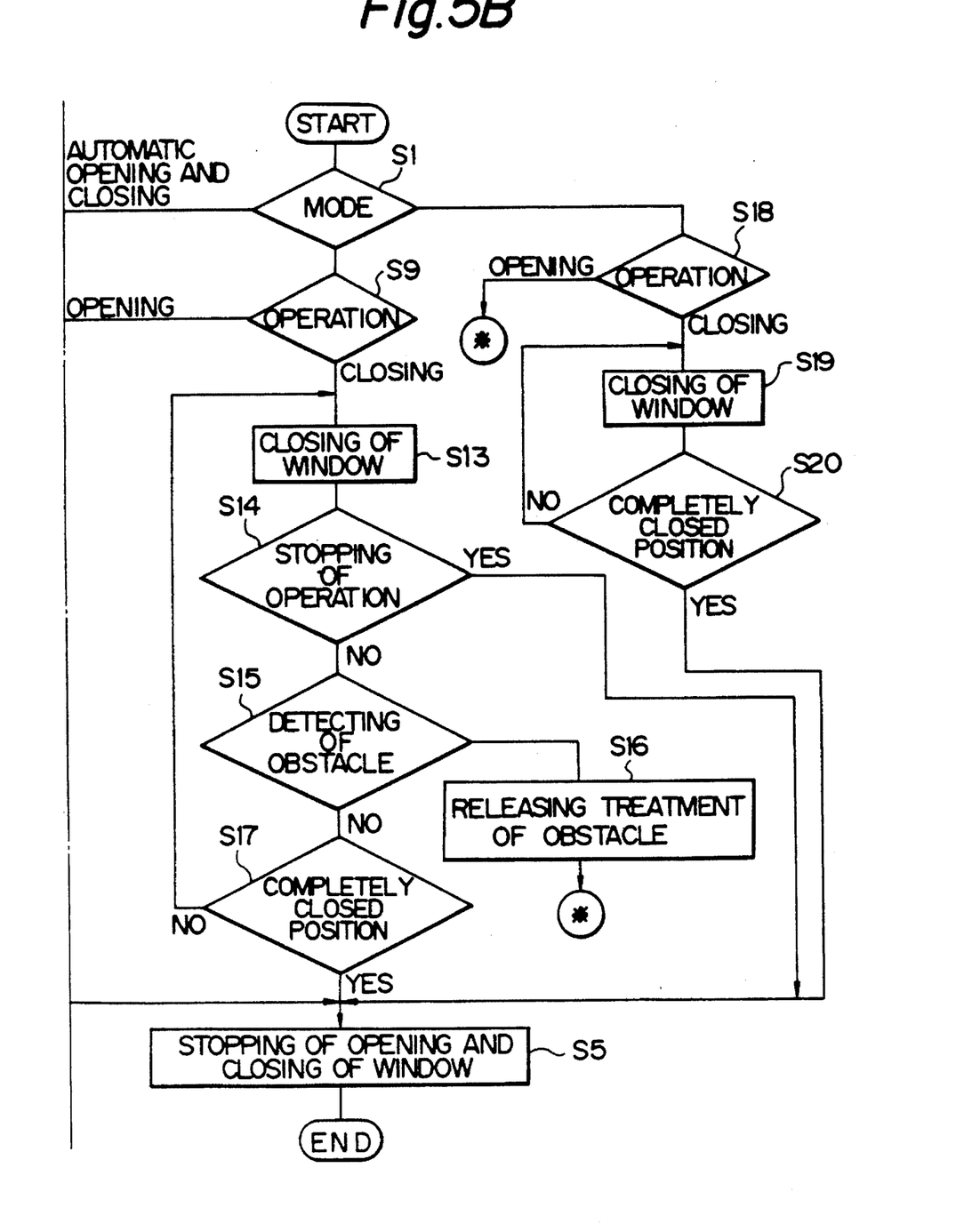

By referring to 5(A)–5(B) which illustrates a flow chart, a series of control processes are explained below.

First, a decision of mode is carried out (Step S1). If a decision is an automatic opening and closing mode, it is decided whether the driver's switch 37 is changed over to the automatic up side terminal 37a or automatic down side terminal 37b (Step S2). If it is decided that the driver switch 37 is changed over to the automatic down side terminal 37d, that is, opening operation is effected, the power window motor 35 is driven in the opening direction to open the window in the driver's seat door (Step S3). Then, it is decided whether the window is moved to the complete open position (Step S4). If the decision is NO, the Step S4 returns to the Step S3 and the Steps S3 and S4 are repeated. If the decision is YES, the power window motor 35 is stopped to stop opening or closing the window (Step S5). Then, a series of operations cease.

On the other hand, in the decision of the Step S2, if it is decided that a so called "closing operation" is carried out by changing over the driver switch 37 to the automatic terminal 37a, the power window motor 35 is driven in the closing direction to close the window in the driver's seat door (Step S6). Whether or not the catching detector 43 detects the catching is decided (Step S7). If the decision is YES, the Step S7 shifts to the Step S3. If the decision is NO, an obstacle is not trapped and whether or not the window is completely opened is decided (Step S8). If the decision is NO, the Step S8 shifts to the Step S6 and if the decision is YES, the Step S8 shifts to the Step S5.

Next, if a result of mode decision of the Step S1 is a manual opening and closing mode due to operation of the sub-switch, it is decided whether up side switch part or down side switch in the sub-switch is changed over (Step S9). If it is decided that an "opening operation" is to be effected by operating the down side switch part of the sub-switch, the power window motor in the associated door except for the driver's seat is driven in the opening direction to open the window (Step S10). Then, whether or not the operation of the down side switch part of the sub-switch is stopped (Step S11). If the decision is YES, the Step 11 shifts to the Step S5 and if the decision is NO, whether or not the window is completely opened (Step S12). If a result of decision is NO, the Step S12 shifts to the Step S10 and the decision is YES, the Step S12 shifts to the Step S9.

In the decision of the Step S9, if it is decided that so called closing operation is carried out by operating the up side switch part of the sub-switch, the power window in the associated door except for the driver's seat is driven in the closing direction to close the window (Step S13). Then, whether or not operation of the up side switch part of the sub-switch is stopped (Step S14). If the decision is YES, the Step S14 shifts to the Step S5.

On the other hand, if the decision is NO, whether or not the obstacle detector detects the catching (Step S15) is decided. If the decision is YES, the process of avoiding an obstacle is carried out (Step S16) and then the Step S16 shifts to the Step S3. If the decision is NO, the catching is not caused and whether or not the window is completely closed is decided (Step S17). If the decision is NO, the Step S17 shifts to the Step S13. If the decision is YES, the Step S17 shifts to the Step S5.

Next, it will be considered a case where the obstacle detector misdetects a deformation or the like of the door or window frame as an obstacle during a usual operation of opening and closing the window, thereby interfering with a normal operation. As a countermeasure, it is possible to set a special mode of forcibly moving the window into a completely open or closed position regardless of a detecting output from the catching detector. For example, it is possible to select a special mode operation by carrying out an operation different from a usual switching operation such as a simultaneous and same operation of different two switches.

If a result of mode decision of Step S1 is the special mode, it is decided whether these switch operations are an opening operation or a closing operation (Step S18). If it is decided to be the opening operation, the Step S18 shifts to the Step S3. If it is decided to be the closing operation, the closing operation of the window without detecting the catching described above (Step S19). Then, whether or not the window is completely closed (Step S20). If the decision is NO, the Step S20 returns to the Step S19. If the decision is YES, the Step S20 shifts to the Step S5. Then, a series of operations ceases.

Accordingly, even if a hand or the like is trapped in a window during closing it by closing a sub-switch at a seat except for the driver's seat, it is possible to avoid the catching, to prevent the catching upon a manual operation of opening and closing as well as an automatic operation of opening and closing, and to improve safety.

(A Second Embodiment)

Figure 6:
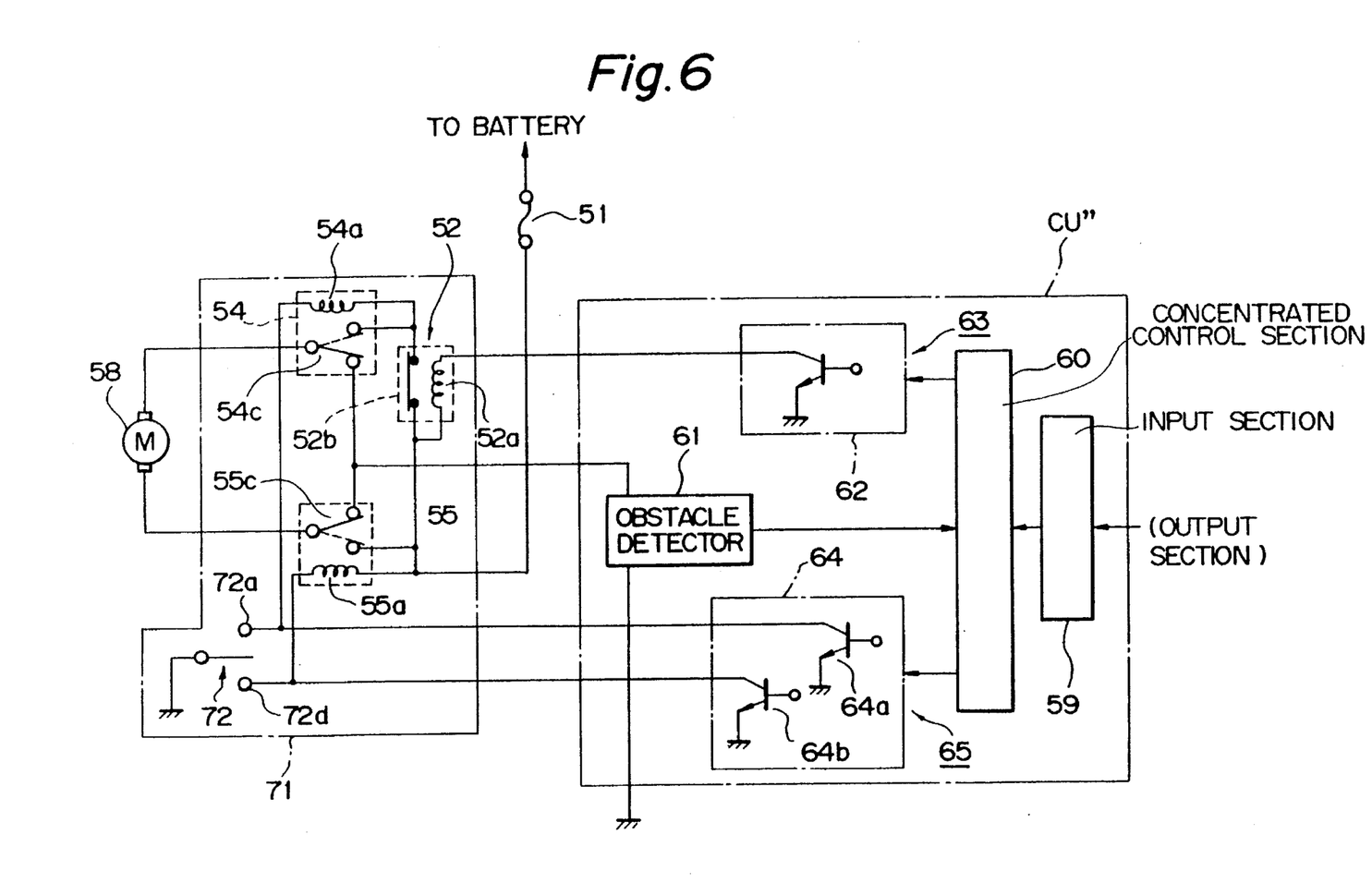
FIG. 6 is a connecting diagram of a part of a second embodiment of the control apparatus in accordance with the present invention.

FIG. 6 shows a connecting diagram of a second embodiment of the present invention. FIG. 6 illustrates constructions of a sub-switch for a passenger's seat provided in a passenger's seat door and a control unit CU".

In FIG. 6, the same signs as those in FIG. 1 indicate the same elements or the corresponding elements. Elements different from those in FIG. 1 are an input section 59, a concentrated control section 60, a catching detector 61, a breaker 62, and a motor driver 64 which are all provided in a control unit CU" and relays which construct a current-flowing together with sub-switches are formed into a single unit.

The fifth relay and sub-switch 57 in FIG. 1 are deleted. The fourth, sixth, and seventh relays 52, 54, and 55 and a sub-switch 72 for a passenger's seat which construct a current-flowing section 71 are formed into a single unit. The power window motor 58 for the window in the passenger's seat door is connected between common terminals of the c-contacts 54c and 55c in the sixth and seventh relays 54 and 55. An up side terminal 72u and a down side terminal 72d in the sub-switch 72 for the passenger's seat are connected to the relay coils 54a and 55a in the sixth and seventh relays 54 and 55. A common contact of the sub-switch 72 is connected to the earth.

Accordingly, the construction shown in FIG. 6 can obtain the same effect as that in the first embodiment.

Figure 8:
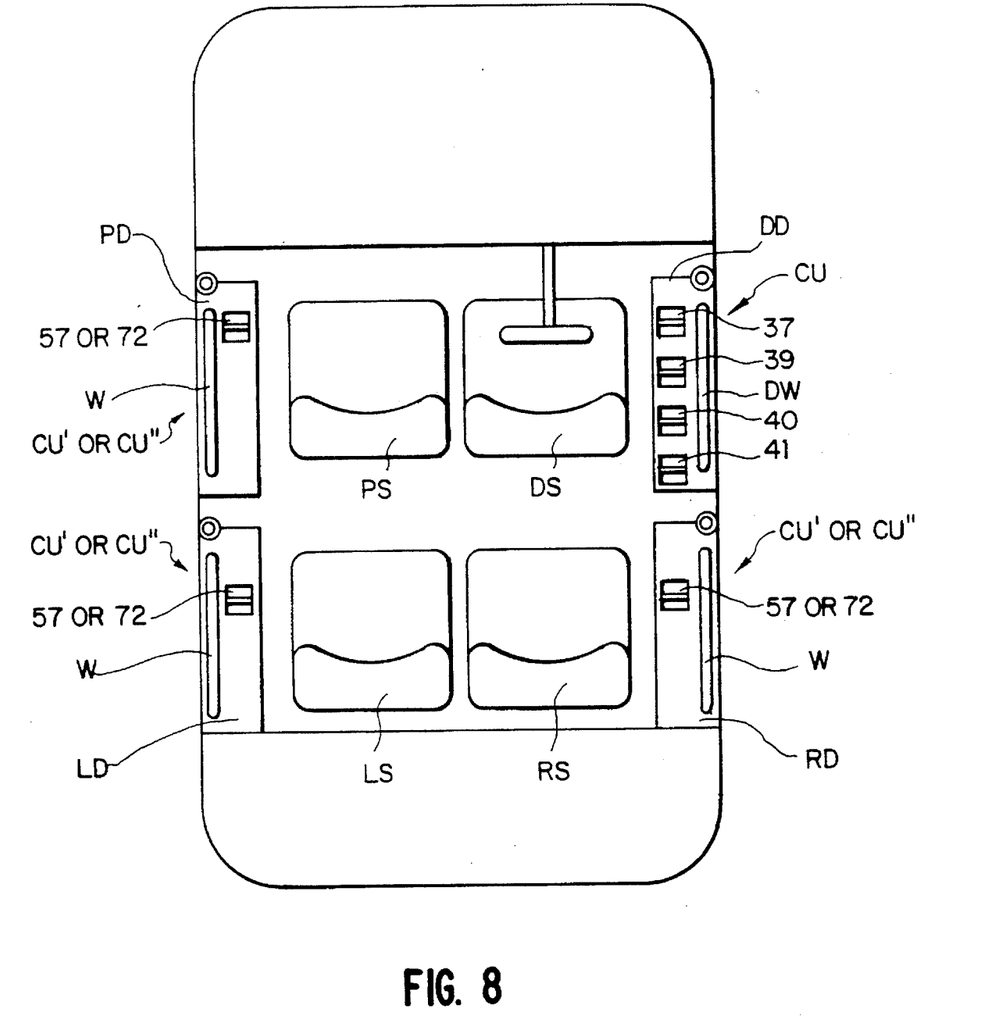
FIG. 8 is a schematic plan view of the interior of an automotive vehicle for showing the arrangement of the various power window switches.

FIG. 8 is a schematic plan view of the interior of an automotive vehicle, illustrating an arrangement of the respective switches shown in FIGS. 1, 2, and 6.

The driver switch 37 and master switches 39 to 41 are provided in the control unit CU in the driver's seat door DD adjacent the driver's seat DS, while sub-switch 57 or 72 is provided in the control unit CU' or CU'' in the passenger's seat door PD adjacent the passenger's seat PS and rear right and left seat doors RD and LD adjacent the rear right and left seats RS and LS. The driver switch 37 has functions for automatically opening and closing the window DW in the driver' seat door DD and for manually opening and closing the window DW. The other switches 39 to 41 and 57 or 72 have a function for manually opening and closing the other windows W, respectively.

It should be noted that the constructions of the current-flowing section, the breaker, and the motor-reversing section are not limited to the above embodiments.

Although the above embodiments are described with respect to an automobile with four doors, the present invention can be applied to an automobile having two doors.

Further, although the window is moved into the complete position upon detecting an obstacle in the above embodiments, the window may be stopped at its present position or at a position which is slightly more open.

As described above, according to the control apparatus for the power window, if an obstacle is detected during closing the sub-switch at a seat except for the driver's seat, it is possible to avoid the obstacle during a manual opening and closing operation as well as during an automatic opening and closing operation, and thereby improve both the function and safety.

What is claimed is:

1. A control apparatus for a power window, comprising:

a sub-switch for opening and closing a window provided in a door other than a driver's seat door;

a master switch provided in the driver's seat door and operative for opening and closing the window provided in the door other than the driver's seat door;

means for flowing currents in opening and closing directions in a power window motor responsive to an on-off operation of said sub-switch;

means for detecting an obstacle such as a hand or the like caught in the window during flowing of the current in the closing direction in said power window motor to generate a detecting signal;

means for breaking the current flowing in the closing direction in the power window motor in response to said detecting signal from said detecting means; and means for reversely rotating said power window motor by flowing the current in the opening direction in said motor in response to said detecting signal, said master switch having priority over said sub-switch, such that the obstacle is released even when the master switch and the sub-switch are operated in opposite directions at the same time, said control apparatus further comprising a driver switch which actuates, either automatically or manually, a further power window motor to open and close a window provided in the driver's seat door, and wherein said means for flowing currents includes an automatic opening and closing mode, a manual mode, and a special mode for forcibly moving at least the window provided in the door other than the driver's seat door into a completely, open or closed position regardless of said detecting signal from said detecting means.

2. A control apparatus for a power window as in claim 1, wherein said means for breaking the current comprises an NPN transistor, a collector of said NPN transistor being connected to said means for flowing currents and an emitter of said NPN transistor being connected to ground.

* * * * *